United States Patent Office 2,909,580
Patented Oct. 20, 1959

2,909,580

OLEFIN POLYMERIZATION PROCESS USING MAINTAINED PHOSPHORIC ACID CATALYST

Edwin T. Layng, Summit, N.J., assignor to Hydrocarbon Research, Inc., New York, N.Y., a corporation of New Jersey No Drawing. Application January 25, 1955
Serial No. 484,061

6 Claims. (Cl. 260—683.15)

This invention relates to a process for the polymerization of olefins and, more particularly, to an improved start-up procedure for such process.

While various processes have been developed and used in the polymerization of olefins, one that has gained commercial prominence in recent years is the process using the so-called phosphoric acid film catalyst. In this process, the olefinic gases are passed at reaction conditions through a catalyst bed of non-porous, inert, solid particles having a thin film of concentrated phosphoric acid disposed on the surfaces thereof. The particle sizes of the inert support, usually quartz, which are best suited for this polymerization process are set forth in U.S. Patent 2,579,433 to Holm and Langlois.

With the film type catalyst, regeneration is readily and simply carried out by washing the catalyst bed to remove its phosphoric acid content and when the inert particles are clean, filling the bed with fresh phosphoric acid and letting the excess acid drain off. Such regeneration is substantially identical with the procedure followed in preparing catalyst for a new plant that is to be put in operation for the first time. Accordingly, the preparation of a new catalyst or the regeneration of a used catalyst involves basically the same steps and results in substantially the same active polymerization catalyst.

The start-up of the polymerization process with freshly prepared phosphoric acid film catalyst has been a matter of considerable concern to plant operators because freshly prepared catalyst exhibits high catalytic activity tending to give overpolymerization and coking difficulties within the catalyst bed. Several start-up schemes have been used but, heretofore, none has been entirely satisfactory or foolproof.

A principal object of this invention is to provide a simple and reliable start-up procedure for the polymerization of olefins with phosphoric acid film catalyst.

In accordance with the invention, after the clean, non-porous, inert, solid particles have been bathed in phosphoric acid of not more than about 85% $H_3PO_4$ concentration, to leave a film of acid on the particle surfaces, a preheated gasiform stream containing the olefins and water vapor is passed through the catalyst bed to raise its temperature to a predetermined level in the ultimate operating range of 250° to 450° F. During the period in which the catalyst bed is being heated to the selected operating temperature, the proportion of water vapor in the preheated gasiform stream is carefully controlled to be substantially in equilibrium with acid in the range of about 85 to 95% $H_3PO_4$ concentration at the temperature and pressure at which the preheated stream contacts the catalyst bed. In short, sufficient water vapor is supplied with the preheated gasiform stream that by the time the catalyst bed has attained the selected or predetermined operating temperature, preferably in the range of 300° to 400° F., and the pressure is also at the selected operating level in the range of 200 to 2000 p.s.i.g. (pounds per square inch gage), the acid film on the inert particles will not have been concentrated to more than about 95% $H_3PO_4$. As soon as the operating temperature and pressure are established in the catalyst bed and the acid film of the catalyst has a concentration in the vicinity of 95% $H_3PO_4$, normal operation of the process is under way.

The activity of phosphoric acid film catalyst increases with acid concentration. During use, at any given acid concentration, the catalyst will show a gradual decrease in activity as noted by a decline in the yield of polymerized product. This slow diminution of catalytic activity or product yield may be compensated for by small increments in the acid concentration of the phosphoric acid catalyst. In accordance with this invention, once the polymerization process is in normal operation, any decrease in catalytic activity is counterbalanced by diminishing the proportion of water vapor in the olefin-containing gasiform stream fed to the reactor. Thus, the acid film of the catalyst loses moisture and becomes more concentrated. The gradual decrease of catalytic activity or product yield, which may extend over several days and even weeks, is restored by gradual curtailment of water vapor in the feed stream.

It is highly advisable, however, that the acid concentration should not be permitted to build up in excess of about 104% $H_3PO_4$. In other words, when a polymerization plant begins to give an unsatisfactory yield of polymerized product with a catalyst which has reached a concentration of 104% $H_3PO_4$, it is far better to stop the operation and regenerate the catalyst than to raise the acid concentration beyond 104% $H_3PO_4$ to augment product yield. This is so, because it has been noted that increased productivity at acid concentrations above 104% $H_3PO_4$ entails a dangerous propensity to form tars and like deposits on the catalyst which make the ultimate regeneration much more difficult and time-consuming. By stopping at an acid concentration of 104% $H_3PO_4$, regeneration is easily and rapidly effected by washing the catalyst with water and coating the clean solid particles with fresh acid of about 70 to 85% $H_3PO_4$ concentration. Tars and the like formed when operating with a catalyst of more than 104% $H_3PO_4$ concentration are difficult to remove from the catalyst bed by water washing and consequently increase the time and cost of regeneration.

Accordingly, in the polymerization of propylene and butylenes, the acid concentration should be maintained in the range of about 95 to 104% $H_3PO_4$, preferably about 98 to 103% $H_3PO_4$, to achieve a high polymerization rate and yet avoid overpolymerization or coking difficulties. While this acid concentration range is perfectly safe when all the process variables of temperature and pressure have been increased to the ultimate operating values and these values are maintained without further substantial change, acid concentrations as low as 97% $H_3PO_4$ have been found troublesome during start-up with freshly prepared catalyst. Attempts to start up with catalyst of 100% $H_3PO_4$ or higher concentration have encountered serious coking troubles.

While herein the phosphoric acid strength is simply referred to as percent $H_3PO_4$, it will be appreciated that the acid is actually an equilibrium mixture of ortho-, pyro- and meta-phosphoric acids. The method of reporting the acid concentration as percent $H_3PO_4$ is explained fully in the article by Langlois and Walkey appearing in Petroleum Refiner, August 1952, pages 79 to 83, inclusive.

For a fuller understanding of the invention, an illustrative example follows:

A cylindrical reactor 7½ feet in diameter and 45 feet in height is provided with five decks supporting five beds of 28- to 35-mesh quartz. The total of the five bed depths is 40 feet. The reactor is flooded with fresh phosphoric acid of approximately 75% $H_3PO_4$ concentration. After draining off excess acid, the catalyst bed is warmed by passing a preheated gaseous stream therethrough while injecting sufficient moisture into the gaseous stream to ensure that the acid film on the quartz particles is not concentrated to more than about 95% $H_3PO_4$. After about 6 hours, the temperature of the catalyst bed is at least 300° F. At this point the reactor is ready for the polymerization of olefins.

A fresh feed containing on an approximate volume basis 54% propylene, 27% propane, 6% ethylene, 10% ethane and 3% methane is supplied to the reactor at the rate of 2,120 barrels per day. The fresh feed is admixed with approximately 2,120 barrels per day of a recycle stream obtained after recovering polymer gasoline from the reactor effluent. The mixed fresh feed and recycle streams enter the reactor in part as a vapor at the top of the uppermost catalyst bed and in part as a liquid at the tops of the four lower catalyst beds to effect quenching of the exothermic polymerization reaction and thereby control the temperature throughout the reactor. Thus, the temperature of each catalyst bed is maintained in the range of about 320° F. at the top and 400° F. at the bottom. The operation is conducted at a pressure of 500 p.s.i.g. measured at the bottom of the lowermost catalyst bed, the pressure range of 300 to 1000 p.s.i.g. being generally preferred for the polymerization of propylene and butylenes.

While the polymerization of olefins is initiated with the catalyst when the acid film thereon has a concentration of approximately 95% $H_3PO_4$, this acid film concentration is gradually raised over a period of 7 weeks of operation until a maximum concentration of 104% $H_3PO_4$ is reached. During this period of operation, the average yield of polymer gasoline is 720 barrels per day.

To maintain the desired acid film concentration, care is taken to provide sufficient water in the reactor feed so as to be in equilibrium with the acid film of the catalyst under the reaction conditions. Some of the required water is added to the fresh feed by passing this stream through a water-wash tower wherein the water is at a temperature of 100° F. Additional water is added, as required, by injecting water into the mixed vapor stream charged to the uppermost catalyst bed.

Over the extended period of operation, the acid film on the catalyst is permitted to become gradually more concentrated to compensate for the gradual decrease in catalytic activity or gasoline yield and thus maintain a substantially uniform rate of gasoline production. However, when the yield of gasoline begins to fall off appreciably after the catalyst has reached an acid film concentration of 104% $H_3PO_4$, the operation is discontinued and the acid film is washed from the quartz particles with water. As soon as the quartz particles have been cleaned, the foregoing sequence of steps is repeated to bring the plant into operation again.

The present invention makes it now possible to control and vary the reaction temperature independently of the acid strength. In some instances, it may be desirable to increase the reaction temperature to compensate for decreasing catalyst activity without changing the acid strength.

Various modifications of the invention will occur to those skilled in the art upon consideration of the foregoing disclosure. For instance, the injection of water to maintain a predetermined acid strength in the polymerization reactor may be done at any level in the reactor as well as at the point where the fresh feed enters the reactor. Accordingly, only such limitations should be imposed as are indicated by the appended claims.

What is claimed is:

1. A process for the catalytic polymerization of olefins wherein a gaseous mixture containing said olefins contacts a phosphoric acid film catalyst, which comprises preparing said catalyst by spreading on the surfaces of non-porous carrier particles a film of fresh phosphoric acid of not more than 85% $H_3PO_4$ concentration, passing in contact with said catalyst a preheated stream of said gaseous mixture together with a proportion of water vapor sufficient to be substantially in equilibrium with an initial operating concentration of acid of about 85 to 95% $H_3PO_4$ at the temperature and pressure of contact until a predetermined operating temperature in the range of 250° to 450° F. and a predetermined operating pressure in the range of 200 to 2000 p.s.i.g. are reached, continuing the passage of said gaseous mixture in contact with said catalyst to polymerize said olefins while maintaining the acid film concentration on the surfaces of said carrier particles at not more than 104% $H_3PO_4$ by the controlled addition of water vapor to said gaseous mixture, interrupting the polymerization reaction when the yield of polymer falls off appreciably at an acid film concentration of not more than 104% $H_3PO_4$, washing said catalyst with water, and repeating the steps of the process as aforesaid.

2. The process of claim 1 wherein the predetermined operating temperature is in the range of 300° to 400° F. and the predetermined operating pressure is in the range of 300 to 1000 p.s.i.g.

3. A process for the catalytic polymerization of olefins wherein a gaseous mixture containing said olefins contacts a phosphoric acid film catalyst, which comprises preparing said catalyst by spreading on the surfaces of non-porous carrier particles a film of fresh phosphoric acid of about 70 to 85% $H_3PO_4$ concentration, gradually heating and drying said catalyst by the passage in contact therewith of a preheated gaseous stream containing a controlled proportion of water vapor until said catalyst attains an operating temperature of at least 250° F. and an initial operating acid film concentration in the range of about 85 to 95% $H_3PO_4$, effecting olefin polymerization by passing in contact with said catalyst said gaseous mixture together with a proportion of water vapor to be substantially in equilibrium with an acid film concentration of not more than 104% $H_3PO_4$, interrupting the polymerization reaction when the yield of polymer falls off appreciably at an acid film concentration of not more than 104% $H_3PO_4$, washing said catalyst with water, and repeating the steps of the process as aforesaid.

4. The method of operating a catalytic polymerization plant wherein a gaseous mixture containing olefins contacts a phosphoric acid film catalyst, which comprises spreading a film of fresh phosphoric acid of about 70 to 85% $H_3PO_4$ concentration on the surfaces of a bed of non-porous, inert solid particles, warming and pressurizing said bed to an operating polymerizing temperature of at least 250° F. and an operating polymerizing pressure of at least 200 p.s.i.g. by passing a preheated gaseous stream through said bed while controlling by the addition of water vapor to said stream the loss of water from the acid film on the surfaces of said bed to yield a catalyst with an acid film of approximately 95% $H_3PO_4$ initial operating concentration, contacting said catalyst with said gaseous mixture to effect olefin polymerization while maintaining the acid film of said catalyst in the range of 95 to 104% $H_3PO_4$ concentration by the controlled addition of water vapor to said gaseous mixture, interrupting the polymerization reaction when the yield of polymer falls off appreciably at an acid film concentration of not more than 104% $H_3PO_4$, washing said catalyst with water, and repeating the aforesaid operating steps.

5. The method of claim 4 wherein the operating polymerizing temperature is in the range of 300° to 400° F. and operating polymerizing pressure is in the range of 300 to 1000 p.s.i.g.

6. The method of operating a catalytic polymerization plant wherein a gaseous mixture containing olefins contacts a phosphoric acid film catalyst, which comprises spreading a film of fresh phosphoric acid of about 70 to 85% $H_3PO_4$ concentration on the surfaces of a bed of non-porous, inert solid particles, warming and pressurizing said bed to an operating polymerizing temperature in the range of 250° to 450° F. and an operating polymerizing pressure in the range of 300 to 1000 p.s.i.g. by passing a preheated gaseous stream through said bed while controlling by the addition of water vapor to said stream the loss of water from the acid film on the surfaces of said bed to yield a catalyst with an acid film of approximately 95% $H_3PO_4$ initial operating concentration, conducting the polymerization of olefins in said gaseous mixture in contact with said catalyst while gradually increasing the acid film concentration of said catalyst over the range of 98 to 103% $H_3PO_4$ by the controlled addition of water vapor to said gaseous mixture, interrupting the polymerization reaction when the yield of polymer falls off appreciably at an acid film concentration of not more than 103% $H_3PO_4$, washing said catalyst with water, and repeating the aforesaid operating steps.

References Cited in the file of this patent

UNITED STATES PATENTS

| | | |
|---|---|---|
| 2,018,066 | Ipatieff | Oct. 22, 1935 |
| 2,135,793 | Brooke | Nov. 8, 1938 |
| 2,579,433 | Holm et al. | Dec. 18, 1951 |
| 2,592,428 | Kemp et al. | Apr. 8, 1952 |
| 2,681,374 | Bethea | June 15, 1954 |
| 2,770,665 | Corn | Nov. 13, 1956 |